US011325416B2

(12) United States Patent
Van Houten et al.

(10) Patent No.: US 11,325,416 B2
(45) Date of Patent: May 10, 2022

(54) COMPOSITE WHEEL ASSEMBLY AND METHOD OF CONSTRUCTION THEREOF

(71) Applicant: Lacks Wheel Trim Systems, LLC, Kentwood, MI (US)

(72) Inventors: Garry Van Houten, Middleville, MI (US); Gerald Nuiver, Hudsonville, MI (US)

(73) Assignee: Lacks Wheel Trim Systems, LLC, Kentwood, MI (US)

( * ) Notice: Subject to any disclaimer, the term of this patent is extended or adjusted under 35 U.S.C. 154(b) by 456 days.

(21) Appl. No.: 16/210,998

(22) Filed: Dec. 5, 2018

(65) Prior Publication Data

US 2019/0184735 A1 Jun. 20, 2019

Related U.S. Application Data

(60) Provisional application No. 62/608,365, filed on Dec. 20, 2017.

(51) Int. Cl.
| | |
|---|---|
| *B60B 5/00* | (2006.01) |
| *B60B 23/10* | (2006.01) |
| *B60B 7/06* | (2006.01) |
| *B60B 5/02* | (2006.01) |
| *B60B 7/04* | (2006.01) |

(Continued)

(52) U.S. Cl.
CPC ................. *B60B 5/00* (2013.01); *B60B 1/12* (2013.01); *B60B 1/14* (2013.01); *B60B 5/02* (2013.01); *B60B 7/04* (2013.01); *B60B 7/065* (2013.01); *B60B 21/064* (2013.01); *B60B 23/10* (2013.01); *B60B 2310/302* (2013.01); *B60B 2310/318* (2013.01); *B60B 2360/104* (2013.01); *B60B 2360/34* (2013.01); *B60B 2360/366* (2013.01);

(Continued)

(58) Field of Classification Search
CPC ........... B60B 7/04; B60B 7/065; B60B 23/10; B60B 3/04; B60B 3/048; B60B 5/00; B60B 5/02
See application file for complete search history.

(56) References Cited

U.S. PATENT DOCUMENTS

| 3,259,274 A | * | 7/1966 | Klasson | ............... B67D 1/0412 |
| | | | | 222/48 |
| 5,636,906 A | | 6/1997 | Chase | |

(Continued)

FOREIGN PATENT DOCUMENTS

| DE | 3904907 A1 | * | 10/1989 | ............. B60B 25/00 |
| DE | 10339431 A1 | * | 3/2005 | ............... B60B 3/04 |
| FR | 2281698 A7 | * | 3/1976 | ............... B60B 7/02 |

*Primary Examiner* — Kip T Kotter
*Assistant Examiner* — Emily G Castonguay
(74) *Attorney, Agent, or Firm* — Dickinson Wright PLLC

(57) ABSTRACT

A composite wheel assembly and method of construction thereof is provided. The composite wheel assembly includes a lightweight annular fiber-reinforced barrel having an inner surface and an outer surface configured to support a tire thereon. A lightweight metal central hub assembly is fixed to the barrel. The metal central hub assembly includes a central hub portion and plurality of support spokes extending outwardly from the metal central hub portion. A wheel cladding contrasting in at least one of material type, color, texture and surface finish to an outwardly facing surface of the central hub assembly is fixed to the outwardly facing surface of the central hub assembly.

42 Claims, 12 Drawing Sheets

(51) Int. Cl.
  *B60B 1/12* (2006.01)
  *B60B 1/14* (2006.01)
  *B60B 21/06* (2006.01)

(52) U.S. Cl.
  CPC ... *B60B 2900/311* (2013.01); *B60B 2900/572* (2013.01)

(56) References Cited

U.S. PATENT DOCUMENTS

| | | | |
|---|---|---|---|
| 5,820,225 A * | 10/1998 | Ferriss | B60B 7/065 |
| | | | 301/37.371 |
| 5,899,538 A | 5/1999 | Tatraux-Paro et al. | |
| 6,346,159 B1 * | 2/2002 | Chase | B29C 44/1233 |
| | | | 156/79 |
| 6,637,829 B1 * | 10/2003 | Jenkins | B60B 7/0053 |
| | | | 301/37.108 |
| 6,663,189 B2 * | 12/2003 | Enomoto | B60B 1/08 |
| | | | 301/37.102 |
| 7,681,958 B1 | 3/2010 | Bagdasarian | |
| 8,020,945 B2 | 9/2011 | Takeda et al. | |
| 8,162,406 B2 | 4/2012 | Heck et al. | |
| 8,465,106 B2 | 6/2013 | Yee et al. | |
| 9,493,031 B2 | 11/2016 | Dick et al. | |
| 9,539,855 B2 | 1/2017 | Werner et al. | |
| 9,573,414 B2 | 2/2017 | Huidekoper | |
| 9,724,962 B2 | 8/2017 | Pieronek et al. | |
| 9,789,729 B2 | 10/2017 | Anderson | |
| 9,834,035 B2 | 12/2017 | Chinavare | |
| 2004/0164606 A1 | 8/2004 | Chase | |
| 2008/0111419 A1 | 5/2008 | Stahel et al. | |
| 2010/0176650 A1 | 7/2010 | Zens et al. | |
| 2010/0181821 A1 | 7/2010 | Noriega | |
| 2010/0237685 A1 * | 9/2010 | Yee | B60B 7/0053 |
| | | | 301/37.43 |
| 2014/0265535 A1 * | 9/2014 | Stratton | B60B 3/10 |
| | | | 301/37.102 |
| 2015/0239286 A1 * | 8/2015 | Boswell-Horstmeyer | B60B 7/0053 |
| | | | 301/37.26 |
| 2015/0273934 A1 * | 10/2015 | Huidekoper | B60B 23/10 |
| | | | 301/11.1 |
| 2015/0367677 A1 * | 12/2015 | Pieronek | B60B 7/04 |
| | | | 301/37.107 |
| 2016/0272000 A1 * | 9/2016 | Chinavare | B60B 3/087 |
| 2016/0325582 A1 * | 11/2016 | Werner | B60B 21/12 |
| 2017/0217249 A1 | 8/2017 | Chenault, III et al. | |
| 2018/0022152 A1 | 1/2018 | Anderson | |
| 2018/0170096 A1 | 6/2018 | Chenault, III et al. | |

* cited by examiner

COMPOSITE WHEEL ASSEMBLY AND METHOD OF CONSTRUCTION THEREOF

CROSS-REFERENCE TO RELATED APPLICATIONS

The present application claims priority to U.S. Provisional Patent Application Ser. No. 62/608,365, entitled "Composite Wheel Assembly", which was filed on Dec. 20, 2017 and which is hereby incorporated by reference as though set forth fully herein.

FIELD OF THE DISCLOSURE

The present disclosure relates generally to automotive vehicles, and more particularly to a composite wheel assembly.

BACKGROUND OF THE DISCLOSURE

Vehicle wheel assemblies have taken on more geometric spoke shapes, multiple colors, and have been reduced in material thickness to enhance the driving performance and appearance of modern, high performance vehicles. It is known to provide wheel assemblies having steel rims including a steel central hub, a steel outer barrel, and steel spokes extending between the central hub and outer barrel. It is further known to incorporate plated surfaces or a metal plated cladding of thin plastic over outboard surfaces of the steel rims to enhance their aesthetic appearance. Although the appearance of the wheel assemblies is enhanced by these plating and cladded surfaces, the strength and bending stiffness of the wheel assemblies is generally unaffected by their presence. As such, the steel material that forms the central hub, outer barrel and spokes of the rim provides the entirety of the strength and bending resistance required for the vehicle. Although the steel rim can be formed to meet the strength and bending resistance requirements, it comes at a cost, including increased weight (static weight), increased Mass Moment of Inertia (MMOI), and increased rotating mass. By focusing on the individual functions of each portion of a wheel assembly, the portions can be optimized to provide a lighter static weight, a lower mass moment of inertial, while providing aesthetically attractive wheels. The use of lightweight rim and center spoke components fashioned from high strength forged heat treated materials is such an example.

SUMMARY OF THE DISCLOSURE

This section provides a general summary of the present disclosure and is not intended to be interpreted as a comprehensive disclosure of its full scope or all of its features, aspects and objectives.

It is an aspect of the present disclosure to provide a composite wheel assembly that addresses at least those issues discussed above with regard to known wheel assemblies.

In accordance with one aspect of the disclosure, a composite wheel assembly having a lightweight, aesthetically pleasing appearance whereby the center spoke portion is economical to change, and the design exhibits a long and useful life is provided.

In accordance with another aspect of the disclosure, a composite wheel assembly is provided including an annular fiber-reinforced barrel extending about a central axis about which the composite wheel assembly rotates. The annular fiber-reinforced barrel has a barrel inner surface facing the central axis and a barrel outer surface facing away from the central axis with at least one flange extending radially inwardly from the barrel inner surface. The annular fiber-reinforced barrel further has a metal central hub assembly having a central hub portion with a through opening that extends about the central axis and a plurality of support spokes extending radially outwardly from the central hub portion. The metal central hub assembly is attached to the at least one flange of the fiber-reinforced barrel. A wheel cladding is fixedly bonded to at least a portion of an outwardly facing surface of the metal central hub assembly.

In accordance with another aspect of the disclosure, the annular fiber-reinforced barrel is formed of a material including at least one carbon fiber, fiber-glass fiber, a basalt fiber.

In accordance with another aspect of the disclosure, the metal central hub assembly is formed from one of cast aluminum, forged aluminum, stamped aluminum, hydroformed aluminum, cast magnesium, forged magnesium.

In accordance with another aspect of the disclosure, the at least one flange has a plurality of flange through openings and the metal central hub assembly has a plurality of hub openings configured in alignment with the flange through openings, and further including a plurality of fasteners extending into the flange through openings and into the hub openings and fixing the metal central hub assembly to the annular fiber-reinforced barrel.

In accordance with another aspect of the disclosure, the hub openings can be threaded blind openings.

In accordance with another aspect of the disclosure, the threaded blind openings can extend into a brake side of at least some of the support spokes.

In accordance with another aspect of the disclosure, the flange through openings can be provided having counter-bores and the fasteners can have threaded shanks configured for threaded engagement in the blind openings and enlarged tool receiving heads sized for receipt in the counter-bores.

In accordance with another aspect of the disclosure, an adhesive can be disposed in the counter-bores to block access (tamper resistant) to the enlarged tool receiving heads.

In accordance with another aspect of the disclosure, the hub openings can be provided as through openings.

In accordance with another aspect of the disclosure, a plurality of threaded nuts can be threaded onto threaded shanks of the fasteners, wherein the threaded nuts can be disposed between the metal central hub assembly and the wheel cladding.

In accordance with another aspect of the disclosure, the support spokes can extend radially outwardly from the central hub portion to free ends.

In accordance with another aspect of the disclosure, the support spokes can extend radially outwardly from the central hub portion to an annular band, wherein the annular band and the support spokes bound a plurality of turbine openings and the annular band abuts the at least one flange.

In accordance with another aspect of the disclosure, the wheel cladding can be permanently bonded to at least some of the support spokes.

In accordance with another aspect of the disclosure, the wheel cladding can be permanently bonded to at least a portion of the central hub portion.

In accordance with another aspect of the disclosure, the wheel cladding can cover a substantial entirety of the outwardly facing surface of the metal central hub assembly.

In accordance with another aspect of the disclosure, cavities can be provided between the support spokes and the wheel cladding, and inserts formed of a light weight foamed material can be disposed within the cavities to eliminate mud and water entrapment.

In accordance with another aspect of the disclosure, the inserts can be permanently bonded to the metal central hub assembly using an adhesive selected from at least one of the following: 1K RTV, 2K RTV, 1K hot melt, epoxy, and 2K urethane.

In accordance with another aspect of the disclosure, a plurality of decorative members can be bonded to an outer surface of the wheel cladding.

In accordance with another aspect of the disclosure, the decorative members can be permanently bonded to the outer surface of the wheel cladding using an adhesive selected from at least one of the following: 1K RTV, 2K RTV, 1K hot melt, epoxy, and 2K urethane.

In accordance with another aspect of the disclosure, the wheel cladding has cladding spokes which can be permanently bonded to at least some of the support spokes, and wherein at least some of the plurality of decorative members can be bonded to the cladding spokes.

In accordance with another aspect of the disclosure, at least some of the cladding spokes can have recessed pockets and at least some of the plurality of decorative members can be bonded in the recessed pockets.

In accordance with another aspect of the disclosure, the wheel cladding can be formed from one of a thermoplastic material, a thermosetting material, a carbon fiber or carbon fiber reinforced material, a fiber-glass material, a material reinforced with an aramid fiber, other fiber reinforced thermoplastic.

In accordance with another aspect of the disclosure, the wheel cladding has an outer surface and can include at least one of an ultraviolet light protectant, a metalizing treatment, texturing treatment, a paint over-coating, and a selective paint coating thereon.

In accordance with another aspect of the disclosure, the color of the outwardly facing surface of the wheel cladding can be different than a color of the barrel inner surface of the annular fiber-reinforced barrel.

In accordance with another aspect of the disclosure, the wheel cladding can be permanently bonded to the metal central hub assembly using an adhesive selected from at least one of the following: 1K RTV, 2K RTV, 1K hot melt, epoxy, and 2K urethane.

In accordance with yet another aspect of the present disclosure, a method of constructing a composite wheel assembly is provided. The method includes providing an annular fiber-reinforced barrel extending about a central axis about which the composite wheel assembly rotates, with the annular fiber-reinforced barrel having a barrel inner surface facing the central axis and a barrel outer surface facing away from the central axis with at least one flange extending radially inwardly from the barrel inner surface. Further, providing a metal central hub assembly having a central hub portion with a through opening extending about the central axis and a plurality of support spokes extending radially outwardly from the central hub portion. Further yet, attaching the metal central hub assembly to the at least one flange of the fiber-reinforced barrel; and fixedly bonding a wheel cladding to at least a portion of an outwardly facing surface of the metal central hub assembly.

In accordance with another aspect of the disclosure, the method can further include providing the annular fiber-reinforced barrel including at least one of: carbon fibers, fiber-glass fibers, or basalt fibers.

In accordance with another aspect of the disclosure, the method can further include providing the wheel cladding being formed of one of a thermoplastic material, a thermosetting material, a carbon fiber material, a carbon fiber reinforced material, a fiberglass material, an aramid fiber reinforced material, a fiber reinforced thermoplastic material, a fiber reinforced thermoset material.

In accordance with another aspect of the disclosure, the method can further include providing the metal central hub assembly being formed via one of the following: forging aluminum, stamping aluminum, hydro-forming aluminum, casting magnesium, forging magnesium.

In accordance with another aspect of the disclosure, the method can further include providing the wheel cladding having at least one of a color and surface finish that contrasts with a color and surface finish of at least one of the annular fiber reinforced barrel and metal central hub assembly.

In accordance with another aspect of the disclosure, the method can further include bonding a plurality of decorative members on an outer surface of the wheel cladding.

In accordance with another aspect of the disclosure, the method can further include providing the wheel cladding having a plurality of cladding spokes and providing recessed pockets in at least some of the cladding spokes and bonding decorative members in the recessed pockets.

In accordance with another aspect of the disclosure, the method can further include forming cavities between at least some of the support spokes and the wheel cladding and providing gap filling inserts in the cavities.

In accordance with another aspect of the disclosure, the method can further include injecting foam material in situ to form the vibration dampening inserts in the cavities.

In accordance with another aspect of the disclosure, the method can further include pre-forming foam material to form the vibration dampening inserts and then subsequently disposing the pre-formed inserts in the cavities.

In accordance with another aspect of the disclosure, the method can further include providing the at least one flange having a plurality of flange through openings and the metal central hub assembly having a plurality of hub openings configured in alignment with the flange through openings, and further including extending a plurality of fasteners into the flange through openings and into the hub openings and fixing the metal central hub assembly to the annular fiber-reinforced barrel.

In accordance with another aspect of the disclosure, the method can further include providing the hub openings as threaded blind openings.

In accordance with another aspect of the disclosure, the method can further include providing the threaded blind openings in a brake side of at least some of the support spokes.

In accordance with another aspect of the disclosure, the method can further include providing the flange through openings having counter-bores and providing the fasteners having threaded shanks configured for threaded engagement in the blind openings and having enlarged fastener receiving heads sized for receipt in the counter-bores.

In accordance with another aspect of the disclosure, the method can further include disposing an adhesive in the counter-bores to block access to the enlarged fastener receiving heads.

In accordance with another aspect of the disclosure, the method can further include providing the hub openings as through openings.

In accordance with another aspect of the disclosure, the method can further include threading a plurality of threaded nuts on the threaded shanks of the fasteners, with the threaded nuts being disposed between the metal central hub assembly and the wheel cladding.

These and other objects, aspects and areas of applicability will become apparent from the description provided herein. The description and specific examples in this summary are intended for purpose of illustration only and are not intended to limit the scope of the present disclosure.

BRIEF DESCRIPTION OF THE DRAWINGS

The drawings described herein are for illustrative purposes only of selected aspects and not all implementations, and are not intended to limit the present disclosure to only that actually shown. With this in mind, various objects, features and advantages of example aspects of the present disclosure will become readily apparent to one possessing ordinary skill in the art from the following written description and appended claims when considered in combination with the appended drawings, in which:

DETAILED DESCRIPTION OF THE DISCLOSURE

Figure 1:
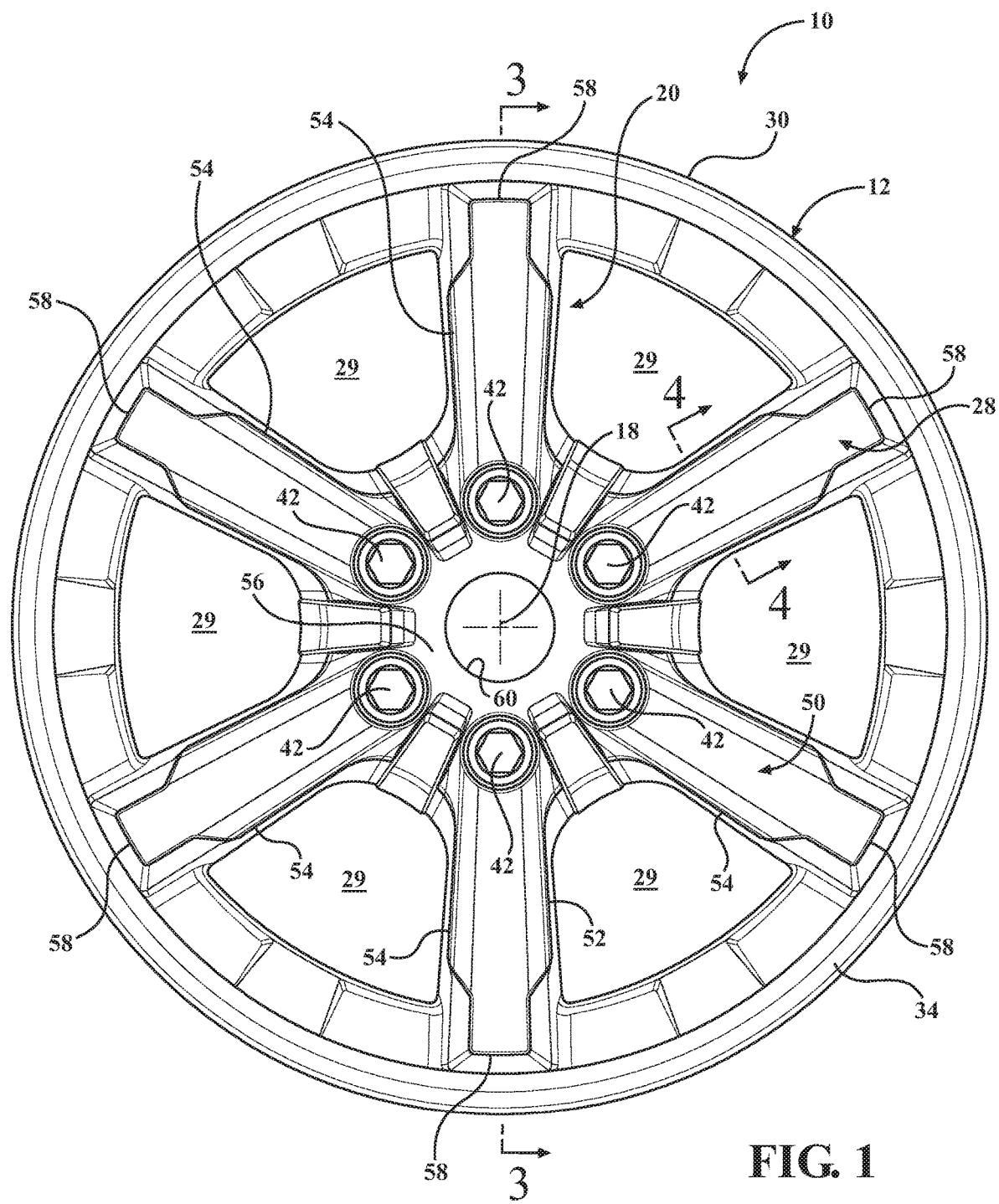
FIG. 1 is an assembled side elevation view of a composite wheel assembly in accordance with an aspect of the disclosure.

In the following description, details are set forth to provide an understanding of the present disclosure.

For clarity purposes, example aspects are discussed herein to convey the scope of the disclosure to those skilled in the relevant art. Numerous specific details are set forth such as examples of specific components, devices, and methods, in order to provide a thorough understanding of various aspects of the present disclosure. It will be apparent to those skilled in the art that specific details need not be discussed herein, such as well-known processes, well-known device structures, and well-known technologies, as they are already well understood by those skilled in the art, and that example embodiments may be embodied in many different forms and that neither should be construed to limit the scope of the disclosure.

The terminology used herein is for the purpose of describing particular example aspects only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or feature is referred to as being "on," "engaged to," "connected to," "coupled to" "operably connected to" or "in operable communication with" another element or feature, it may be directly on, engaged, connected or coupled to the other element or layer, or intervening elements or features may be present. In contrast, when an element is referred to as being "directly on," "directly engaged to," "directly connected to," or "directly coupled to" another element or feature, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly and expressly indicated by the context. Thus, a first element, component, region, layer or section discussed below could be termed a second element, component, region, layer or section without departing from the teachings of the example embodiments.

For purposes of description herein, the terms "upper," "lower," "right," "left," "rear," "front," "vertical," "horizontal," and derivatives thereof shall relate to the invention as oriented in the FIGS. However, it is to be understood that the present disclosure may assume various alternative orientations and step sequences, except where expressly specified to the contrary. It is also to be understood that the specific devices and processes illustrated in the attached drawings, and described in the following specification are exemplary aspects of the inventive concepts defined in the appended claims. Hence, specific dimensions and other physical characteristics relating to the aspects disclosed herein are not to be considered as limiting, unless the claims expressly state otherwise.

Figure 2:
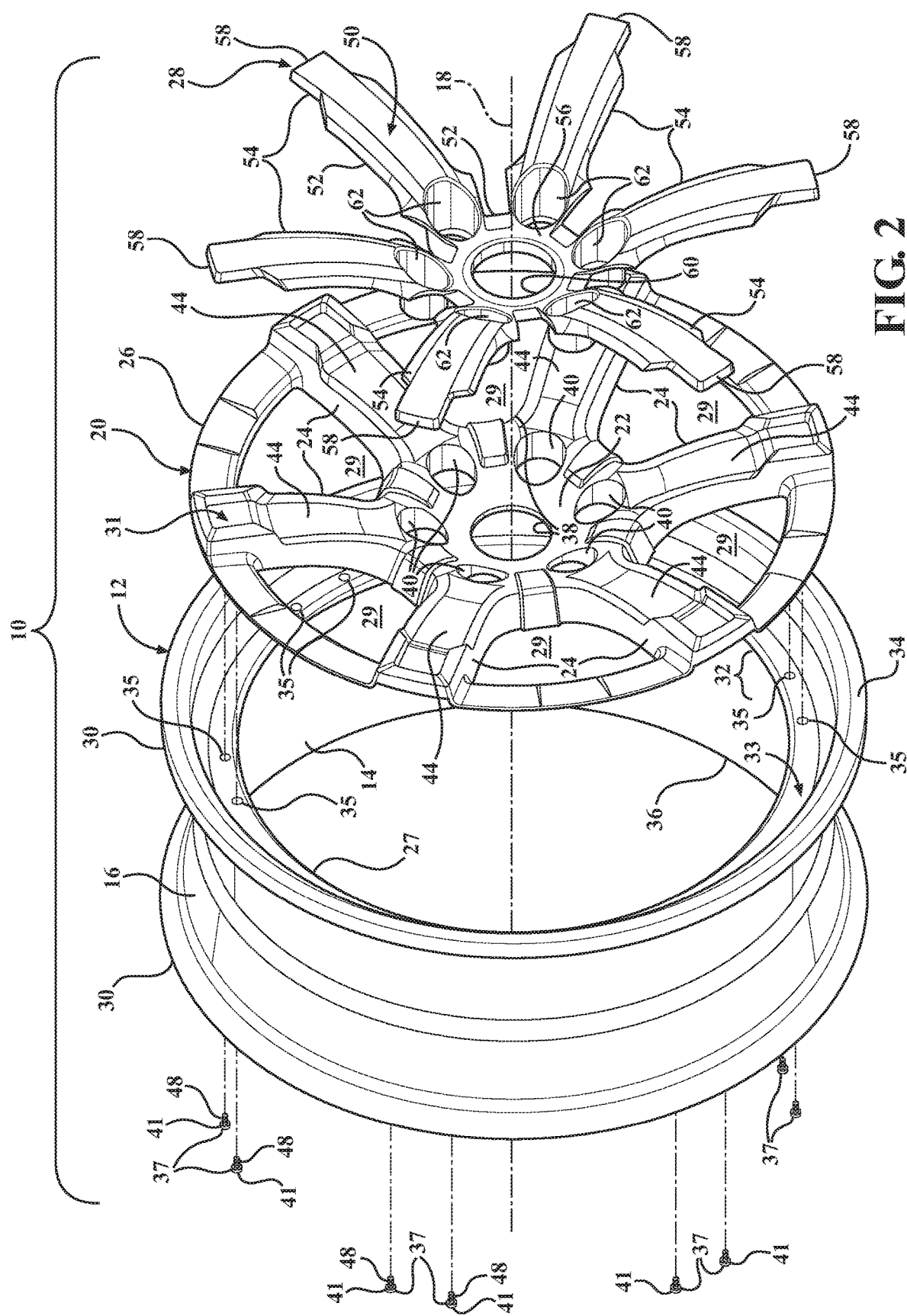
FIG. 2 is an exploded view of the wheel assembly of FIG. 1.
Figures 3, 4:
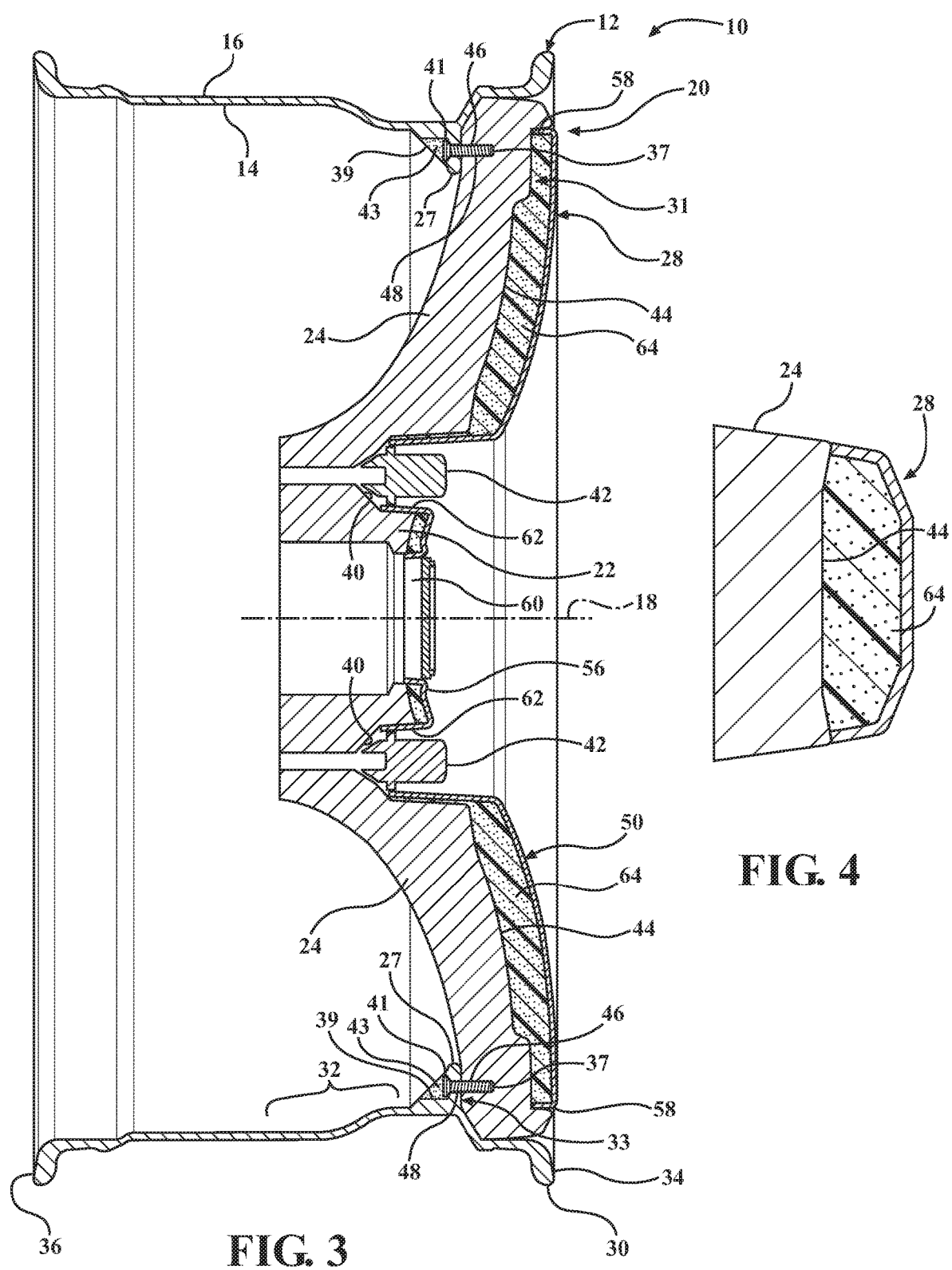
FIG. 3 is a cross-sectional view taken generally along the line 3-3 of FIG. 1.
FIG. 4 is a cross-sectional view taken generally along the line 4-4 of FIG. 1.
Figure 5:
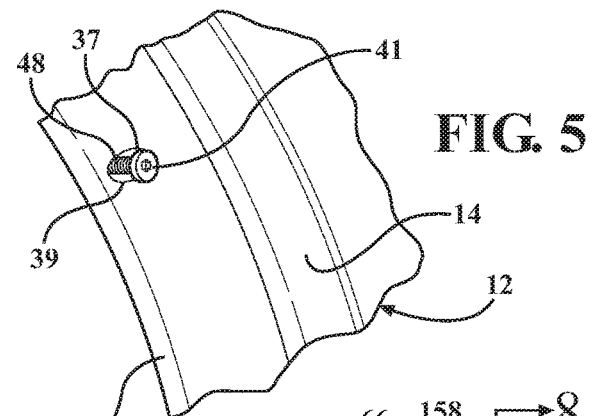
FIG. 5 is a partial back side view of the wheel assembly of FIG. 1 illustrating a fastener being assembled thereto.

Referring in more detail to the drawings, FIGS. 1-3 illustrate a composite wheel assembly 10 including a lightweight annular fiber-reinforced rim, also referred to as barrel 12, having a radially inwardly facing inner surface 14 and a radially outwardly facing outer surface 16 configured to support a tire (not shown) thereon for rotation about a central axis 18. The composite wheel assembly 10 further includes a high strength, lightweight metal central hub assembly 20 including a central hub portion 22 and plurality of structural spoke members, referred to hereafter as support spokes 24, extending radially outwardly from the central hub portion 22 and away from the central axis 18 to an annular band 26. According to an aspect, the annular band 26 can be fixed in abutting relation with at least one radially inwardly extending flange 27 of the barrel 12. The annular band 26 and support spokes 24 delimit, and thus bound circumferentially enclosed turbine openings 29. The composite wheel assembly 10 may further include an aesthetically pleasing, decorative, lightweight, high strength wheel cladding 28 fixed to an outwardly facing surface 31 (outwardly facing is intended to mean the surface 31 faces away from a brake side and away from an undercarriage of the vehicle) of at least a portion of the central hub assembly 20. With the barrel 12 being fabricated of a fiber-reinforced material, and the central hub assembly 20 being fabricated of a relatively lightweight, high strength metal, such as aluminum, magnesium, by way of example and without limitation, and further with the wheel cladding 28 being lightweight and decorative, the composite wheel assembly 10 can ultimately be lightweight, extremely durable and visually pleasing, with the wheel cladding 28 being highly customizable in size, shape, color, texture, and features, as discussed further below, to provide the aesthetic appearance desired.

The barrel 12 can be formed of any suitable high strength, lightweight fiber-reinforced material, with some presently preferred high strength, lightweight fiber-reinforced materials including carbon fiber, fiber-glass fiber and basalt fiber. It will be appreciated that a variety of other suitable fibrous materials may be employed. The barrel 12 is formed being generally cylindrical, having a generally cylindrical wall defined by the inner and outer surfaces 14, 16 which extend axially between radially outwardly extending rim beads 30 configured for sealed engagement with seal beads of the tire (not shown). The outer surface 16 is ultimately concealed from viewing by the tire, while at least a portion or a substantial entirety (substantial entirety is intended to mean that aside from those regions covered by the free ends 26 of the support spokes 24 and the central hub assembly 20, the remainder of the inner surface 14 can remain visible) of the inner surface 14, as desired, can remain visible, particularly an axially outermost, radially inner region 32 adjacent an environment side 34 opposite a brake side 36 of barrel 12. The flange 27 is illustrated as being a circumferentially continuous, annular flange 27 having a generally planar mount surface 33 facing away from the brake side 36 and toward the environment side 34. The mount surface 33 is configured for abutment with a brake side facing surface of the annular band 26 of central hub assembly 20, wherein the annular flange 27 is shown having a plurality of fastener through openings, also referred to as flange through openings 35, configured for receipt of fasteners 37 therethrough. The flange through openings 35 can be formed having enlarged counterbores 39 sized for receipt of enlarged tool receiving heads 41 of the fasteners 37, wherein an adhesive 43, such as a thick viscosity adhesive, epoxy resin, elastomeric compound or the like, can be disposed within the counterbore 39 to cover and block access to the tool receiving heads 41, thereby rendering the composite wheel assembly 10 tamper-resistant.

The central hub assembly 20 can be fabricated of lightweight aluminum, such as being fabricated of one of cast aluminum, forged aluminum, stamped aluminum, hydroformed aluminum, or machined aluminum. Additionally, it is contemplated that the central hub assembly 20 can be fabricated of forged magnesium or case magnesium. It will be appreciated that a variety of suitable materials may be employed and which can be fabricated in a variety of suitable ways. Accordingly, it is to be recognized that the central hub portion 22, support spokes 24 and annular band 26 may be constructed of a monolithic, single piece of material. The central hub portion 22 can be formed having an opening, also referred to as hub aperture 38, extending therethrough along the central axis 18 about which the composite wheel assembly 10 rotates. The central hub portion 22 can further be formed having a plurality of fastener openings 40 formed as through holes, with the fastener openings 40 being arranged in a predetermined pattern, such as along a circular arc having a radius centered at the central axis 18, with the fastener openings 40 being sized for close receipt of fasteners (not shown) therethrough on which lugnuts 42 can be threaded to facilitate fixation of the composite wheel assembly 10 to the desired vehicle platform. The support spokes 24 are shown having recessed pockets 44 extending between the fastener openings 40 and the annular band 26. The recessed pockets 44 can be formed having any desired shape to accommodate the desired shape of the wheel cladding 28. A plurality of fastener openings, also referred to as hub openings 46 (FIG. 3), are formed in the central hub assembly 20 for alignment with the flange through openings 35 to facilitate fixing the central hub assembly 20 to the barrel 12, wherein the hub openings 46 are shown as being female threaded blind openings extending into the brake side of the central hub assembly 20 for threaded engagement with a threaded shank 48 of fasteners 37, and further shown as extending into brake side of at least some of or all of the support spokes 24 in a radially outermost region generally aligned circumferentially with the annular band 26. It should be recognized that the hub openings 46 could extend into the annular band 26 if desired.

An outer surface 50 of the wheel cladding 28, facing toward the environment side 34, can be painted or have a paint over-coating, textured via a texturizing treatment or otherwise finished to provide a particularly desired aesthetic appearance, such as a metal plated surface via a metallizing treatment, by way of example and without limitation, and can further include an outer ultraviolet light protectant. Accordingly, the outward appearance of the wheel cladding 28 can be easily and economically provided with a specialized, highly detailed decorative finish, and can be provided having any desired pattern or array of colors desired, thereby providing enhanced color compliment or contrast, as desired, relative to the metal central hub portion and relative to the fiber-reinforced barrel 12, such as the barrier inner surface 14, by way of example and without limitation.

The wheel cladding 28 can be formed having a geometry which substantially conforms to that of the central hub portion 22 and support spokes 24 of central hub assembly 20, namely, having an outer peripheral rim or edge 52 which matingly fits within (inside), on top (in alignment), or as shown, both on top and with the recessed pocket 44 of support spokes 24 and over central hub portion 22 of central hub assembly 20. The wheel cladding 28 is shown, by way of example and without limitation, having a plurality of cladding spokes 54 extending radially outward from a centrally-located hub region 56 to free ends 58. The wheel cladding 28 is further shown as having a hub aperture 60 and a plurality of lugnut receiving receptacles or lugnut apertures 62 configured for clearance receipt of the lugnuts 42, wherein the cladding spokes 54 generally correspond in size, shape and location to the plurality of support spokes 24. The hub aperture 60 aligns and registers with the hub aperture 38 in the central hub assembly 20 and the lugnut receiving apertures 62 align and register with the fastener openings 40 of the central hub assembly 20 when the wheel cladding 28 is fixedly attached to the central hub assembly 20. As a result, the wheel cladding 28 appears as an integral, aesthetically pleasing outwardly facing surface of the composite wheel assembly 10, shown as covering the entirety or substantial entirety (meaning slightly less than the entirety) of the central hub portion 22 and the recessed pockets 44 of support spokes 24. It will also be appreciated that the wheel cladding 28 can cover less than all of the central hub portion 22 (i.e. partial covering) to allow for further contrasting appearances.

The wheel cladding 28 is permanently fixed to the outwardly facing surface 31 of the central hub assembly 20 via an adhesive 64. The adhesive 64 can be disposed within at least some or all of the recessed pockets 44 and can further be disposed on at least a portion or the entirety of the central hub portion 22, and/or on a brake side of wheel cladding 28, whereupon wheel cladding 28 and central hub assembly 20 can be pressed together to form a permanent bond between central hub assembly 20 and wheel cladding 28. The adhesive 64 can be provided as 1K RTV, 2K RTV, 1K hot melt, epoxy, and 2K urethane, by way of example and without limitation.

Figure 6:
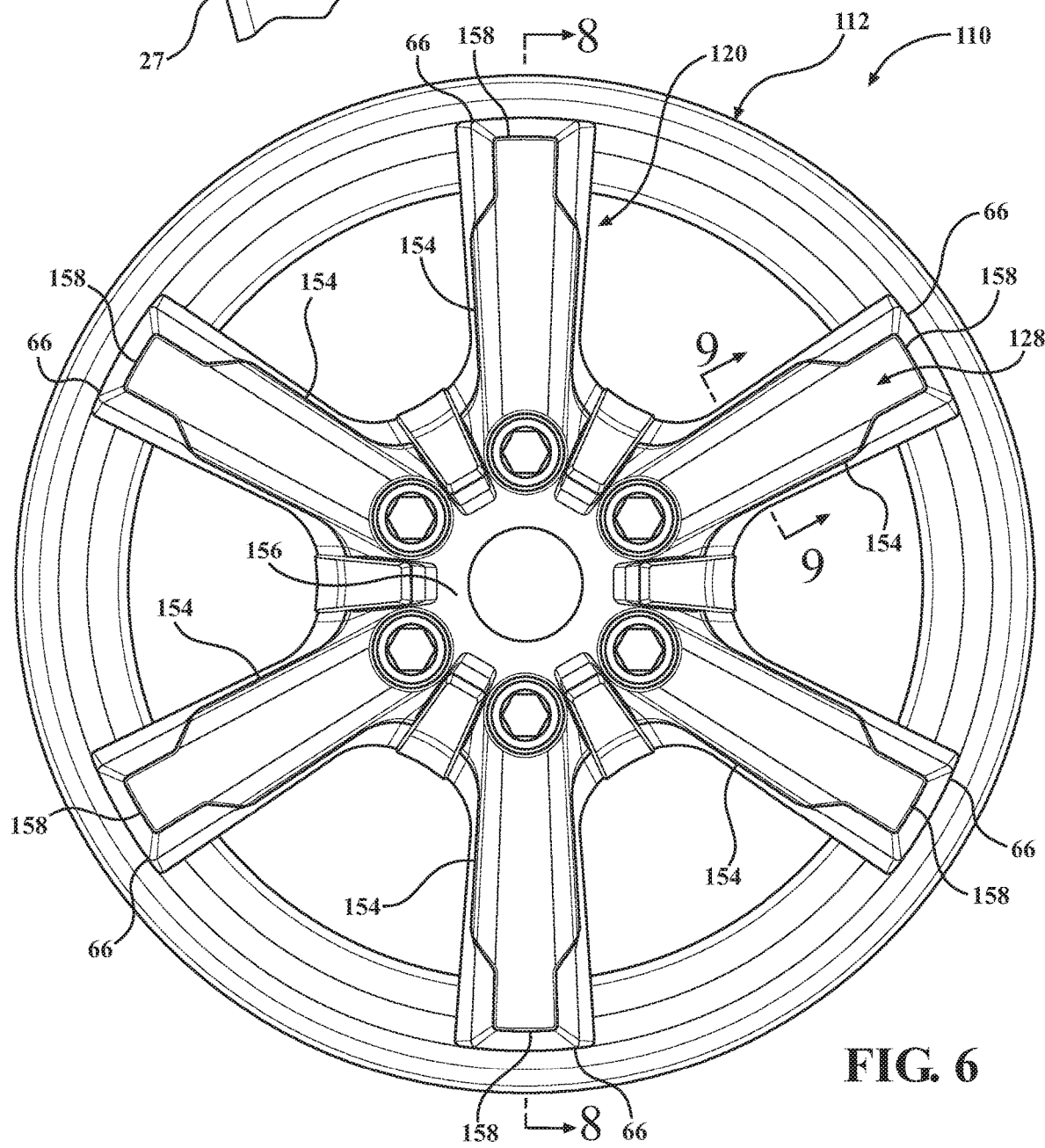
FIG. 6 is an assembled side elevation view of a composite wheel assembly in accordance with another aspect of the disclosure.
Figure 7:
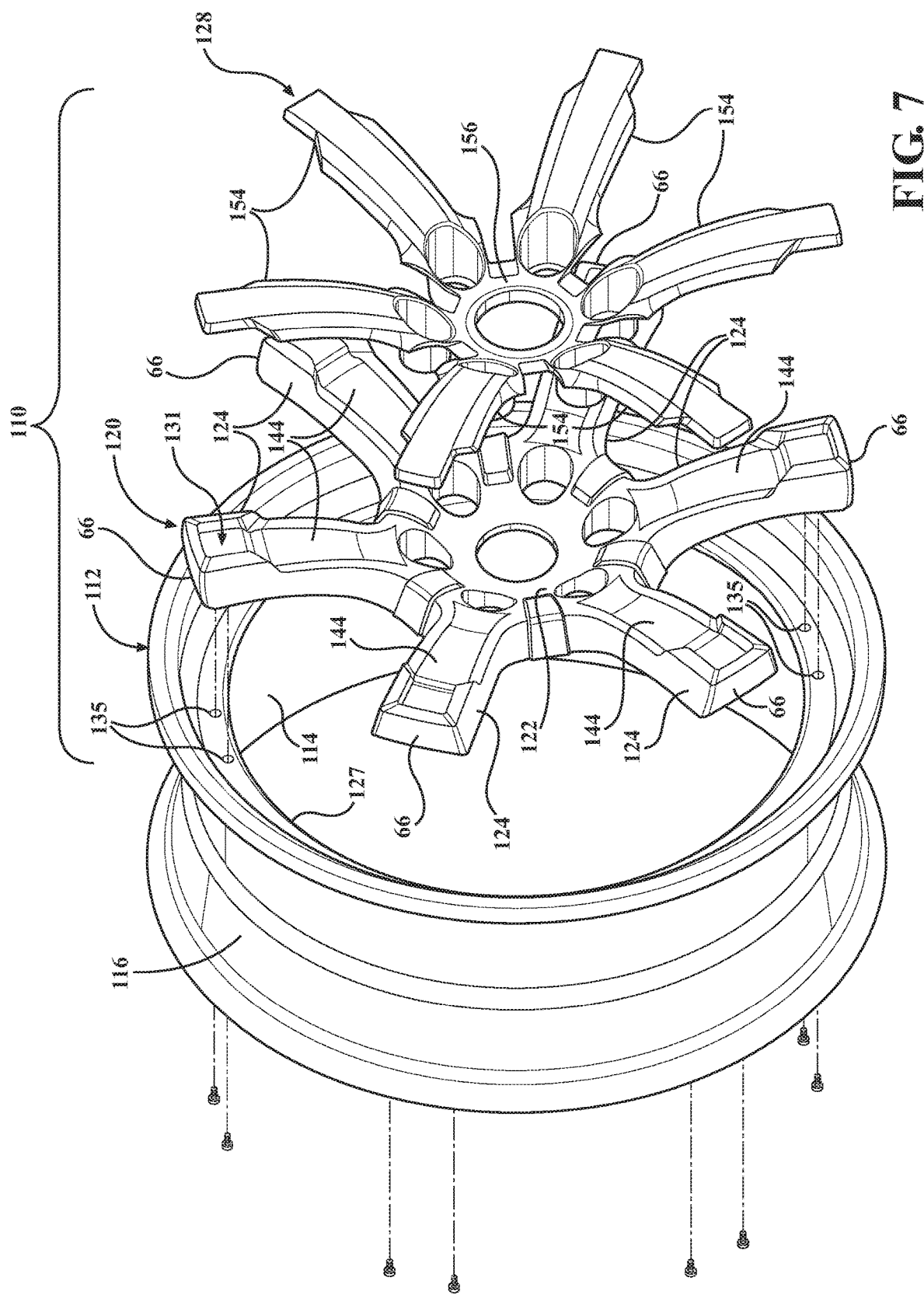
FIG. 7 is an exploded view of the wheel assembly of FIG. 6.
Figures 8, 9:
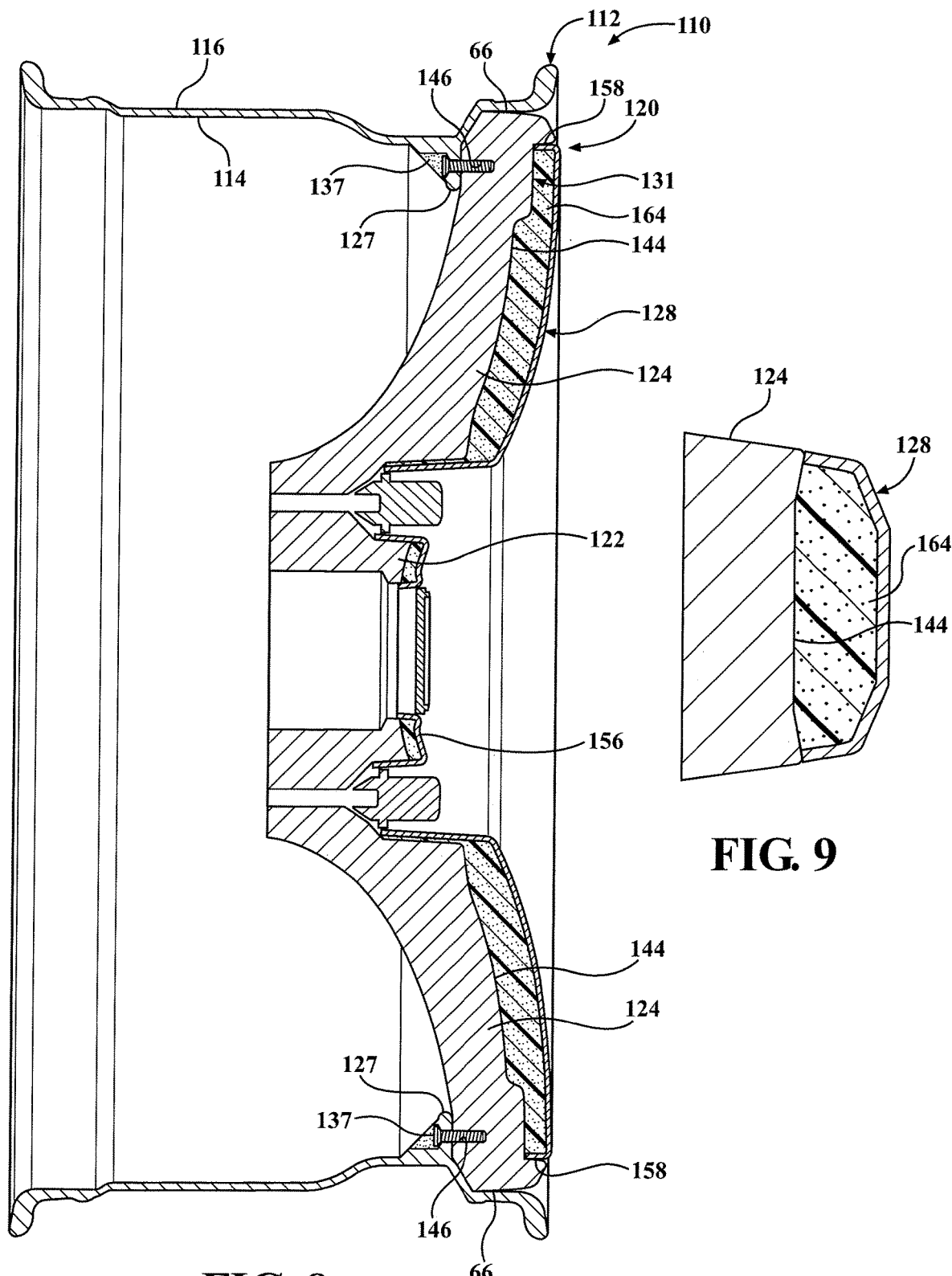
FIG. 8 is a cross-sectional view taken generally along the line 8-8 of FIG. 6.
FIG. 9 is a cross-sectional view taken generally along the line 9-9 of FIG. 6.

In FIGS. 6-8, a composite wheel assembly 110 constructed in accordance with another aspect of the disclosure is shown, wherein the same reference numerals, offset by a factor of 100, are used to identify like features. The composite wheel assembly 110 includes the same features discussed above for composite wheel assembly 10, including a lightweight annular fiber-reinforced barrel 112, having radially inwardly facing inner surface 114 and a radially outwardly facing outer surface 116; a high strength, lightweight metal central hub assembly 120 including a central hub portion 122 and plurality of support spokes 124 extending radially outwardly from the central hub portion 122; however, rather than extending outwardly to an annular band, the support spokes 124 extend radially outwardly to free ends 66 that are disconnected from one another, and thus, the outer periphery of the central hub assembly 120 is circumferentially discontinuous; an aesthetically pleasing, decorative, lightweight, wheel cladding 128 fixed to an outwardly facing surface 131 of at least a portion of the central hub assembly 120, with the cladding 128 having a plurality of cladding spokes 154 extending radially outward from a centrally-located hub region 156 to free ends 158; and an adhesive 164 disposed within at least some or all of a plurality of recessed pockets 144 and can further be disposed on at least a portion or the entirety of the central hub portion 122, and/or on a brake side of wheel cladding 128, whereupon wheel cladding 128 and central hub assembly 120 can be pressed together to form a permanent bond between central hub assembly 120 and wheel cladding 128 via the adhesive 164. The adhesive 164 can be provided as 1K RTV, 2K RTV, 1K hot melt, epoxy, and 2K urethane, by way of example and without limitation. Further, the central hub assembly 120 can be attached to the barrel 112 via a plurality of fasteners 137 disposed through a plurality of through openings 135 in an annular flange 127 extending radially inwardly from the inner surface 114 of barrel 112 and threaded into threaded openings, such as threaded blind openings 146 extending into a brake side of central hub assembly 120, such as in a brake side of an outermost region of support spokes 124. Each of the above features of composite wheel assembly 110 may be the same or substantially the same as discussed above for composite wheel assembly 10, with the exception of not having an annular band extending between the support spokes 124, and thus, further description of details thereof is unnecessary, as one possessing ordinary skill in the art will readily appreciate the similarities.

Figure 10:
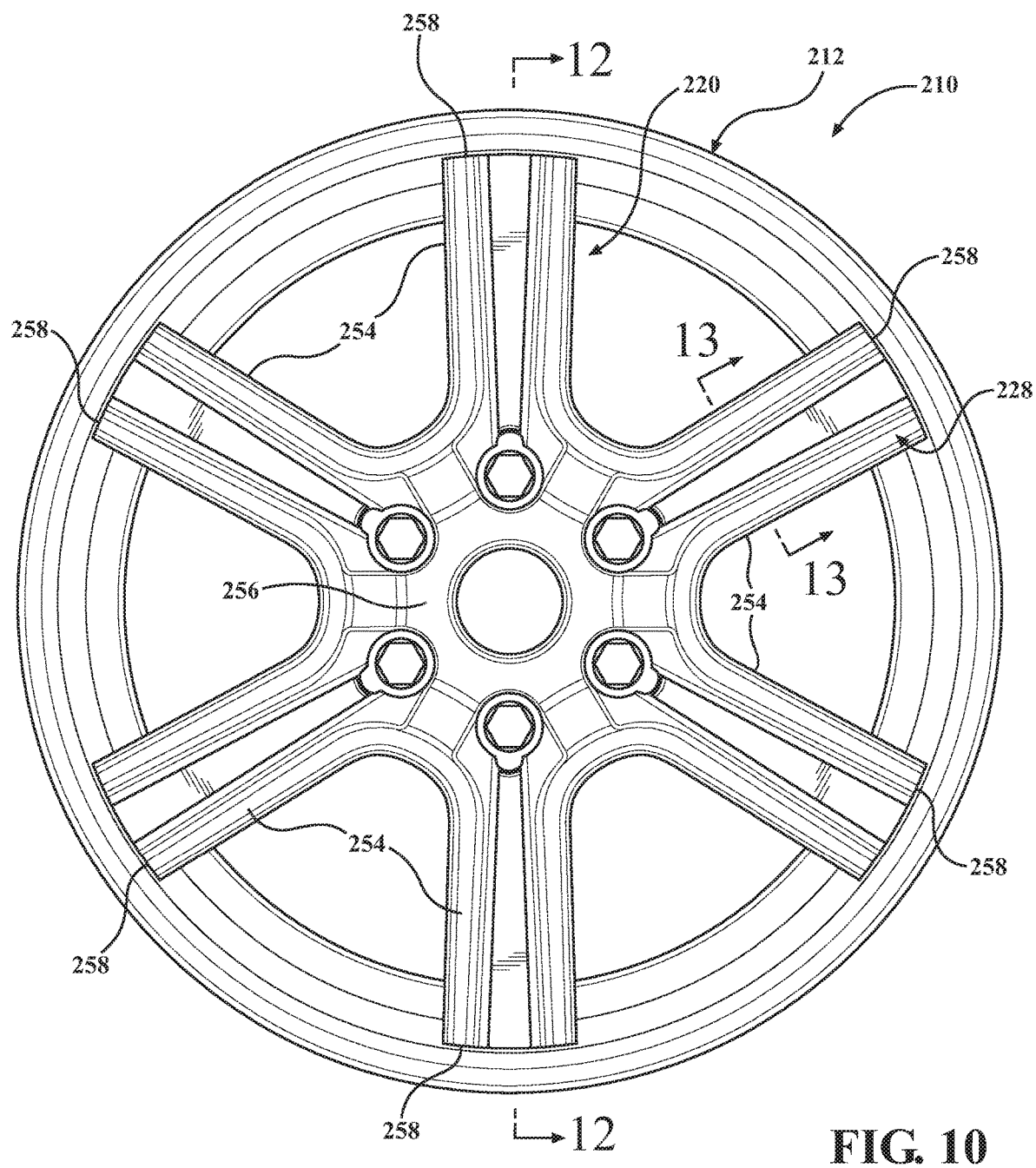
FIG. 10 is an assembled side elevation view of a composite wheel assembly in accordance with another aspect of the disclosure.
Figure 11:
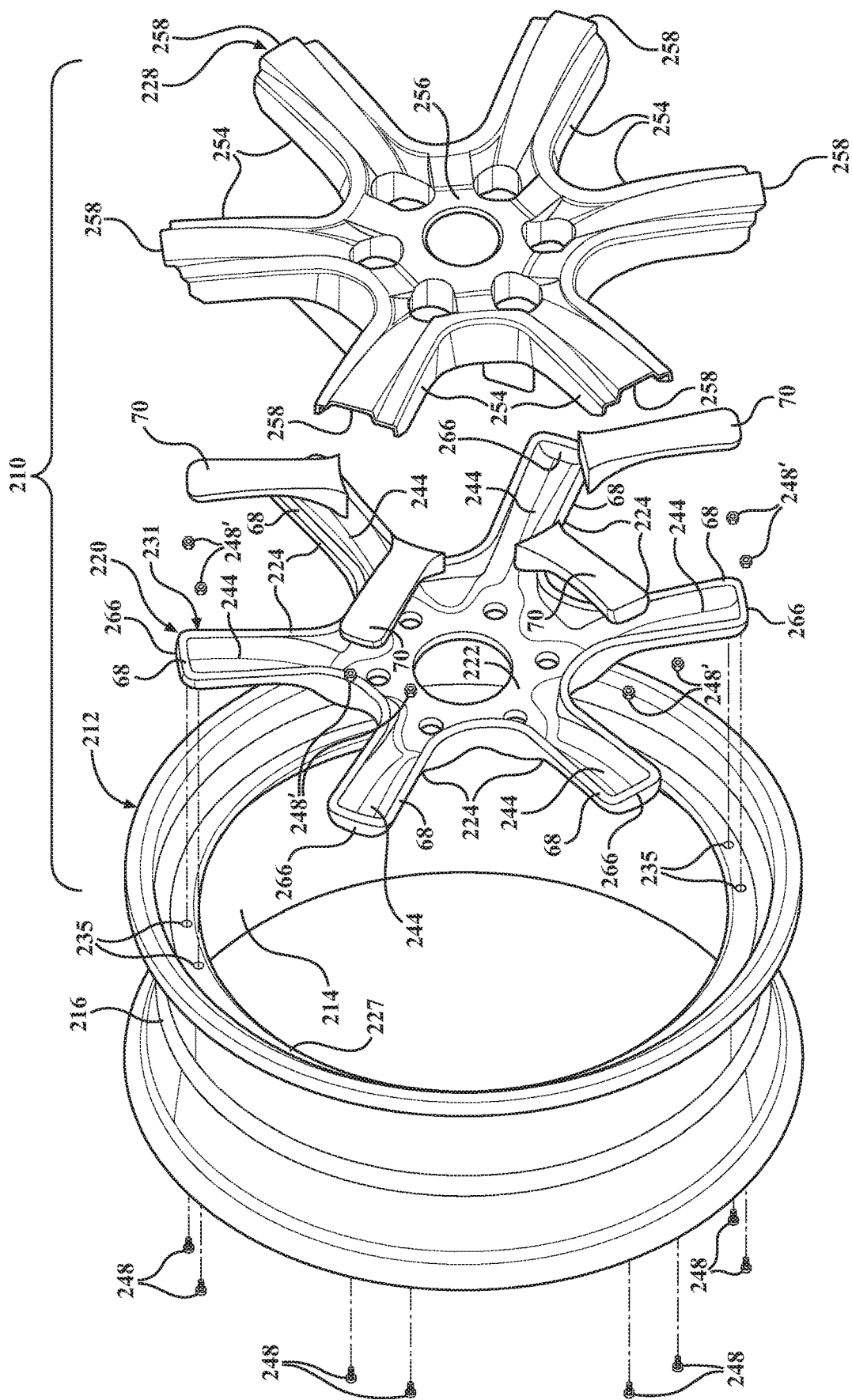
FIG. 11 is an exploded view of the wheel assembly of FIG. 10.
Figures 12, 13:
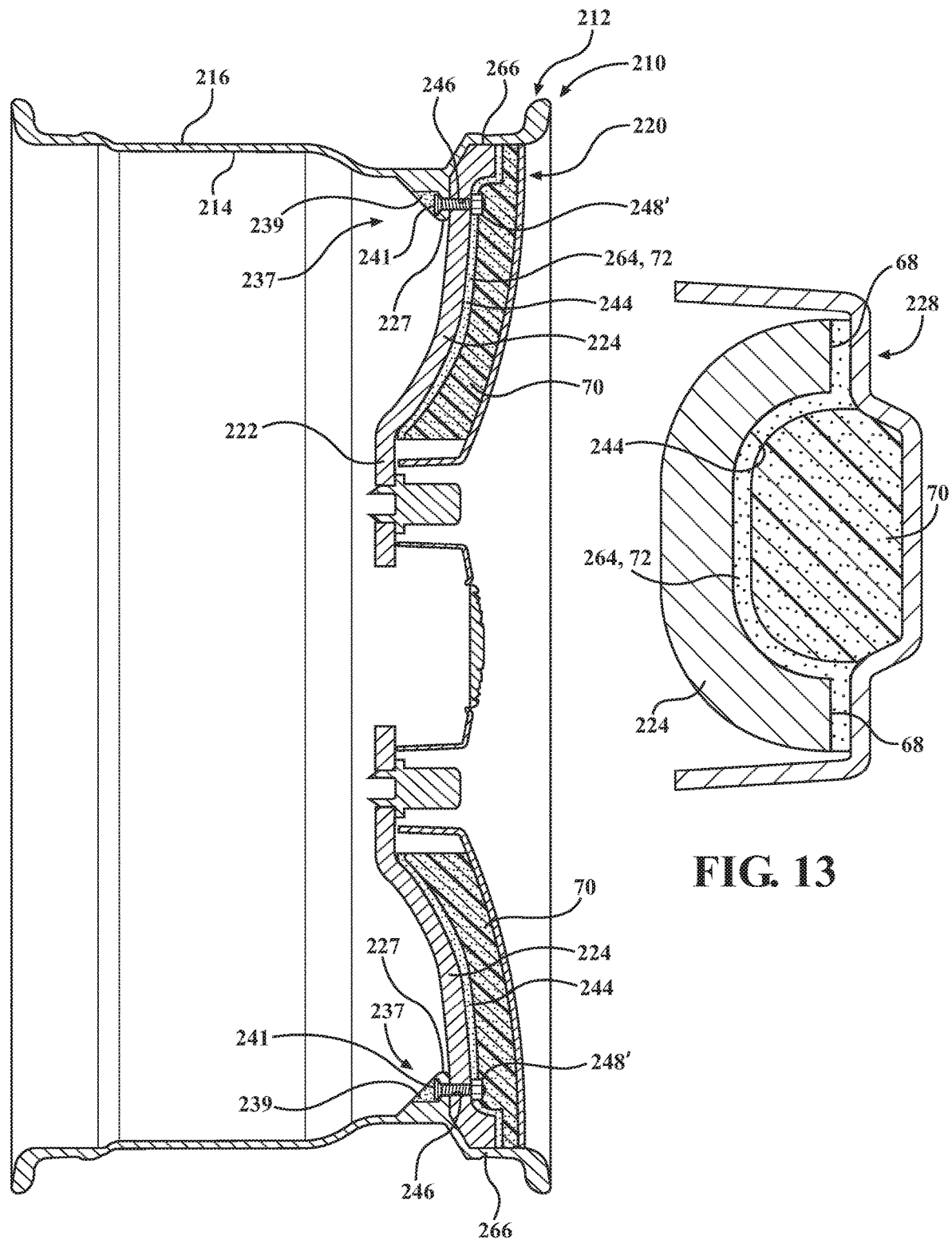
FIG. 12 is a cross-sectional view taken generally along the line 12-12 of FIG. 10.
FIG. 13 is a cross-sectional view taken generally along the line 13-13 of FIG. 10.

In FIGS. 10-12, a composite wheel assembly 210 constructed in accordance with another aspect of the disclosure is shown, wherein the same reference numerals, offset by a factor of 200, are used to identify like features. The composite wheel assembly 210 includes the same features discussed above for composite wheel assembly 110 including a lightweight annular fiber-reinforced barrel 212, having radially inwardly facing inner surface 214 and a radially outwardly facing outer surface 216; a high strength, lightweight metal central hub assembly 220 including a central hub portion 222 and plurality of support spokes 224 extending radially outwardly from the central hub portion 222 to free ends 266 that are disconnected from one another, and thus, the outer periphery of the central hub assembly 220 is circumferentially discontinuous; an aesthetically pleasing, decorative, lightweight, wheel cladding 228 fixedly bonded to an outwardly facing surface 231 of at least a portion of the central hub assembly 220, with the cladding 228 having a plurality of cladding spokes 254 extending radially outward from a centrally-located hub region 256 to free ends 258; and an adhesive 264 disposed about (FIG. 13) at least some or all of a plurality of recessed pockets 244, immediately on an outer peripheral edge 68 of support spokes 224 facing away from the brake side and toward the environment side, and/or within at least some or all of a plurality of recessed pockets 244, and can further be disposed on at least a portion or the entirety of the central hub portion 222, and/or on a brake side of wheel cladding 228, whereupon wheel cladding 228 and central hub assembly 220 can be pressed together to form a permanent bond between central hub assembly 220 and wheel cladding 228 via the adhesive 264. The adhesive 264 can be provided as 1K RTV, 2K RTV, 1K hot melt, epoxy, and 2K urethane, by way of example and without limitation.

The composite wheel assembly 210 is shown to further include a gap filling feature, also referred to as inserts 70, completely filling or substantially filling (meaning that a minimal air pocket may remain) at least some or all of the cavities 244 formed in the support spokes 224, wherein the cavities 244 are bounded between the support spokes 224 and the cladding spokes 254, and wherein the cavities 244 can also be formed in part by extending into the cladding spokes 254, if desired to increase the size of the cavities 244 and the inserts 70. The inserts 70 can be pre-formed and subsequently disposed as solid members within the cavities 244 bounded by the recessed walls of support spokes 224 and/or optionally recessed walls of cladding spokes 254. The inserts 70 may be formed of a light weight material. A variety of suitable materials may be employed. If pre-formed and disposed as separated pieces of material into the cavities 244, a bonding agent can be used to fix the inserts 70 against movement within the cavities 244, such as via an adhesive 72 including one of a room temperature vulcanization silicone adhesive (RTV), or an alternate adhesive, such as epoxy, silicone-based hot melt adhesive, or any other suitable adhesive.

In assembly, upon the inserts 70 being disposed in the cavities 244 of the support spokes 224, the wheel cladding 228 can be bonded to the central hub assembly 220, such as via adhesive 264 and/or via supplemental bonding agent, via continuous or segmented beads of a bonding adhesive(s) 264, 72, which can also be used to fix the inserts 70 in place, if desired. Some exemplary aspects of a suitable adhesive 72 include a urethane foam, room temperature vulcanization silicone adhesive (RTV), or an alternate adhesive, such as epoxy, silicone-based hot melt adhesive, or any other suitable adhesive that would permanently fix the wheel cladding 228 to the central hub assembly 220 for the duration of the useful life of the vehicle. It is to be recognized that the selected adhesive can be placed on an inner surface of the wheel cladding 228 and/or on the outwardly facing surface of the central hub assembly 220, such as on the outwardly facing peripheral edge, also referred to as rim 68 (FIG. 13), by way of example and without limitation, as a continuous layer or in sections or patterns, as desired, and can further be disposed in the cavities 244 to fix the inserts 70 in place. Once a bead of the desired adhesive 264, 72 is applied to at least one of the inwardly facing surface of the wheel cladding 228 and/or to the outwardly facing surface of the central hub assembly 220, the wheel cladding 228 is aligned with the central hub assembly 220, as desired, and the wheel cladding 228 is then pressed against the desired region of the outwardly facing surface 231 of the central hub assembly 220 for permanent fixation thereto.

The central hub assembly 220 can be attached to the barrel 212 via a plurality of fasteners 237 disposed through a plurality of through openings 235 in an annular flange 227 extending radially inwardly from the inner surface 214 of barrel 212, and further extended through hub openings, such as through openings 246 extending through a radially outmost region of a wall of the support spokes 224. The fasteners 237 are shown, by way of example and without limitation as including male threaded bolts 248 and female threaded nuts 248', wherein enlarged tool receiving heads 241 of bolts 248 are disposed within counterbores 239 of flange 227, with male threaded shanks extending through respective flange through openings 235 and hub through openings 246 into cavities 244, wherein the nuts 248' can then be threaded onto the threaded shanks and brought into snug abutment with an inner wall surface of support spokes 224, such that the nuts 248' are disposed between the central hub assembly 220 and the wheel cladding 228, thereby fixing central hub assembly 220 to barrel 212. It should be recognized that central hub assembly 220 can be fixed to barrel 212 prior to disposing inserts 70 in cavities 244, such that the nuts 248' can be locked on threaded shanks via the adhesive 264, 72 used to fix inserts 70 within cavities 244 of support spokes 224. Each of the above features of composite wheel assembly 210 may be the same or substantially the same as discussed above for composite wheel assembly 110, with the exception of the inclusion of inserts 70 and nuts 248' threaded onto shanks of bolts 248, and thus, further description of details thereof is unnecessary, as one possessing ordinary skill in the art will readily appreciate the similarities.

Figure 14:
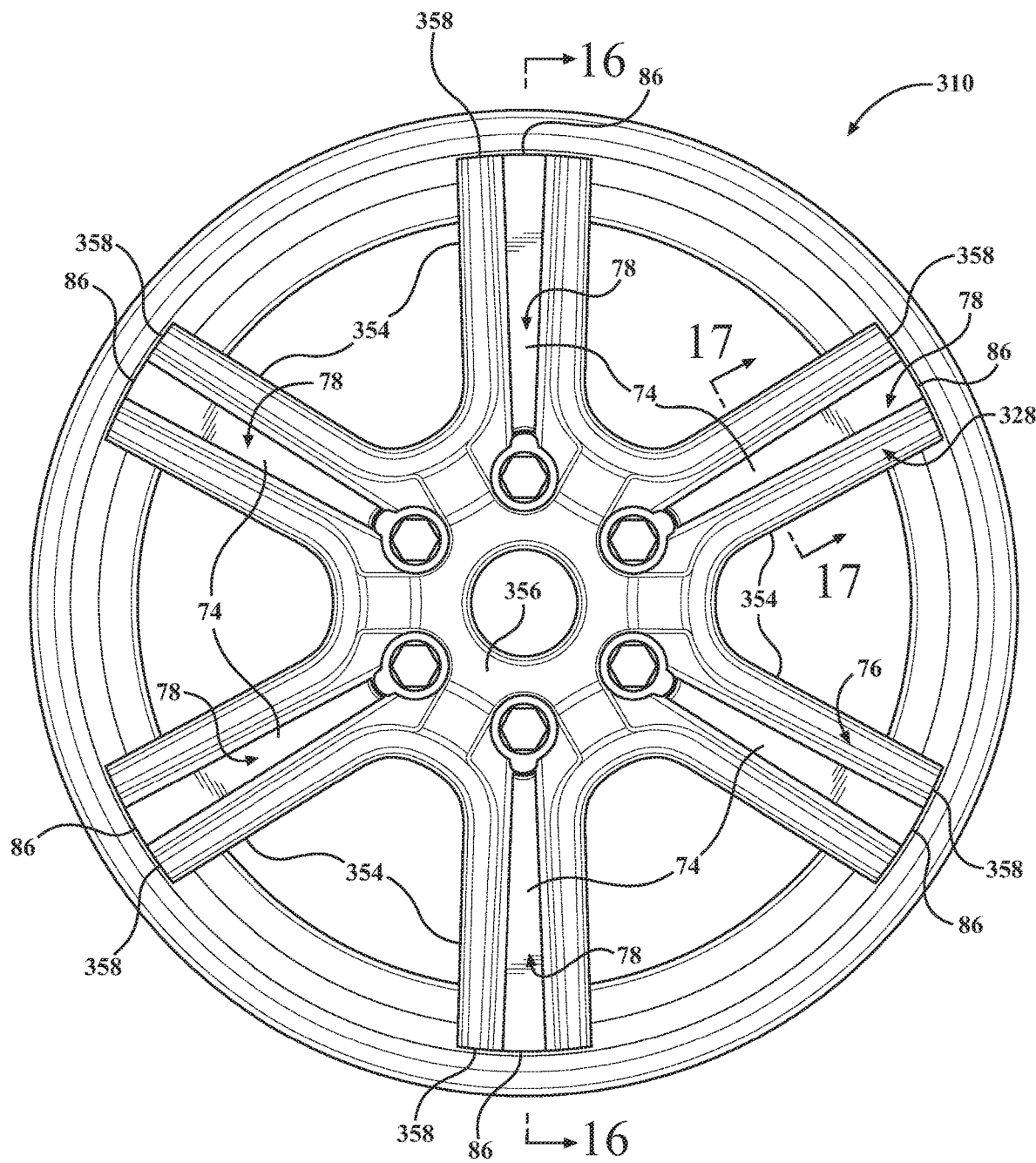
FIG. 14 is an assembled side elevation view of a composite wheel assembly in accordance with another aspect of the disclosure.
Figure 15:
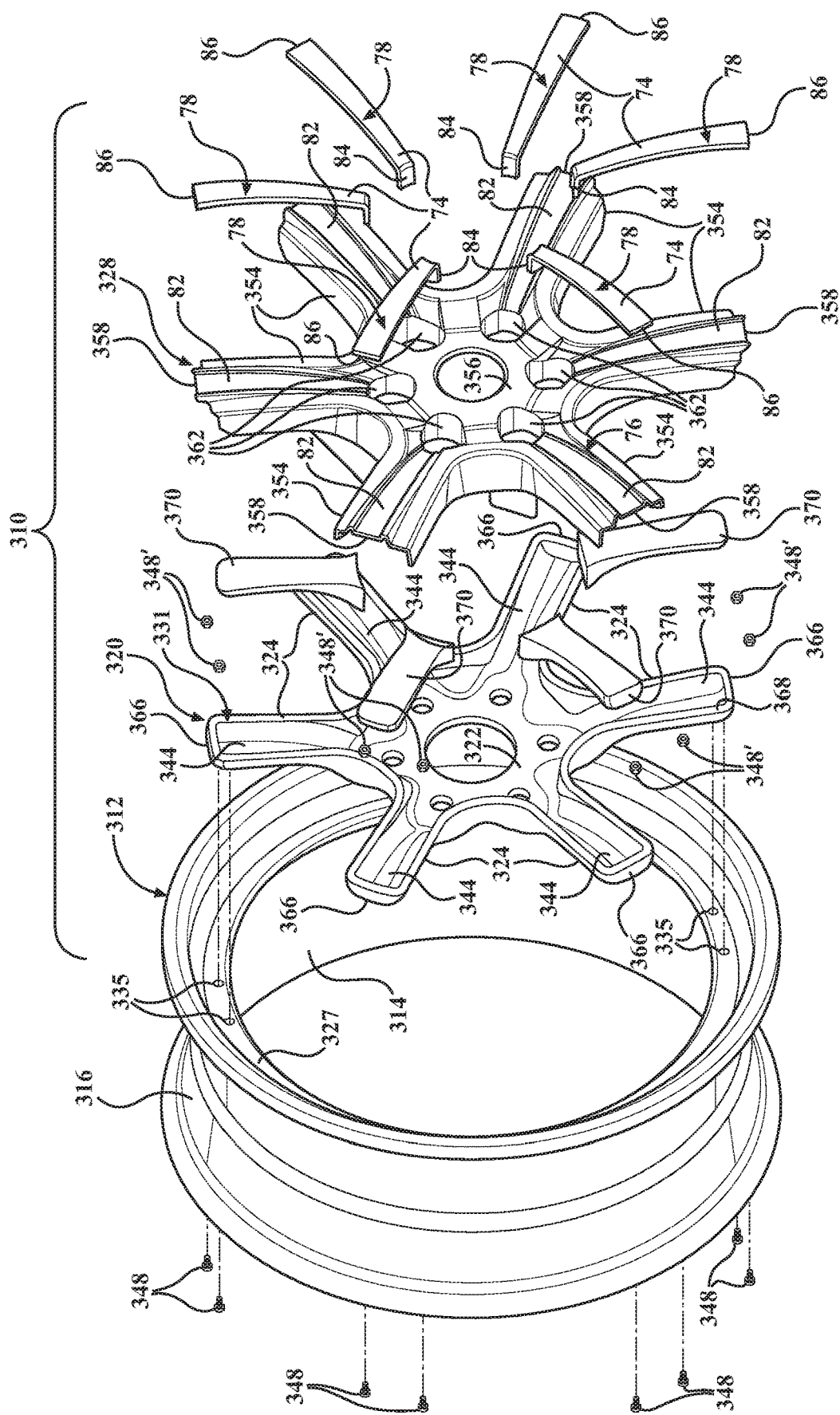
FIG. 15 is an exploded view of the wheel assembly of FIG. 14.
Figures 16, 17:
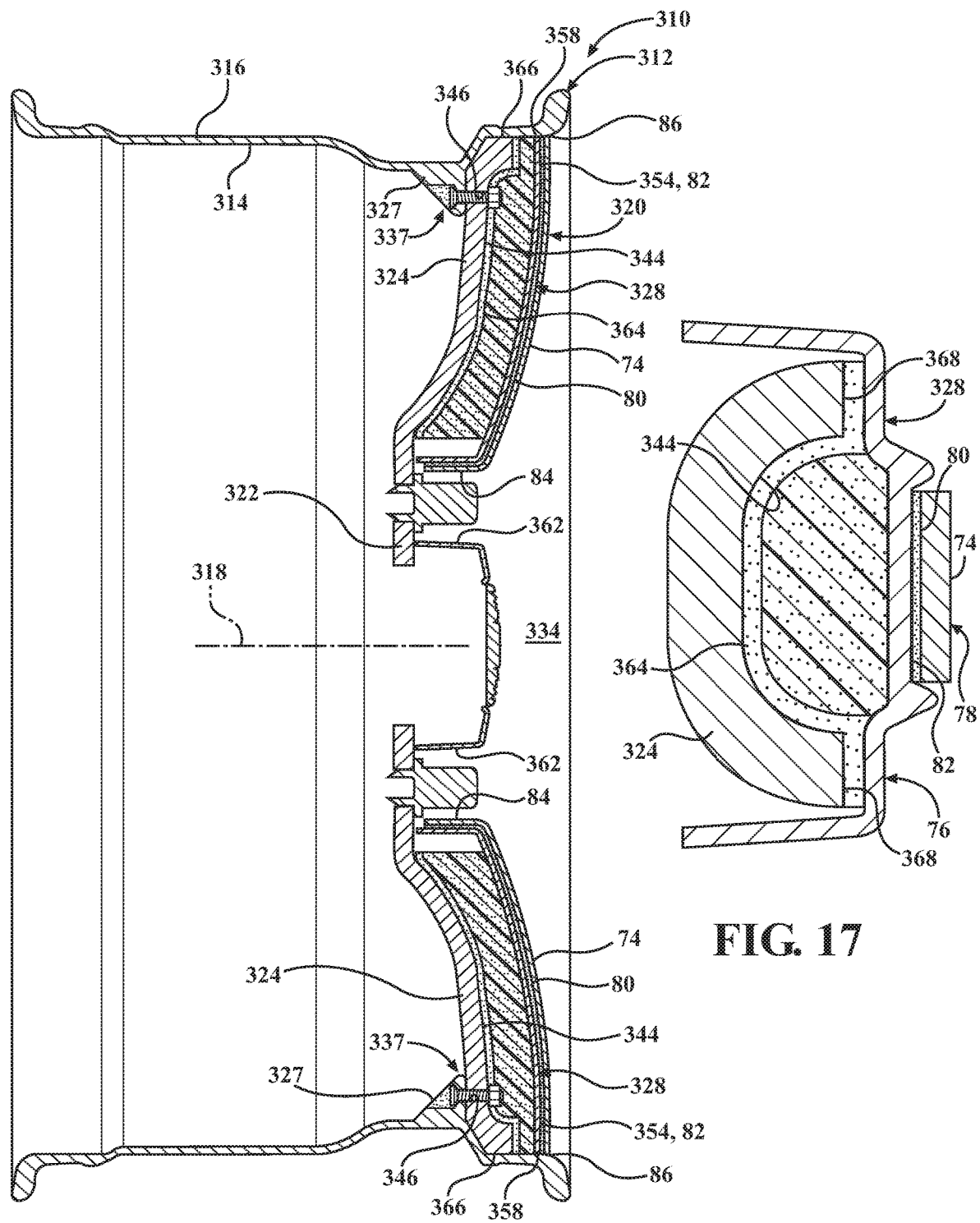
FIG. 16 is a cross-sectional view taken generally along the line 16-16 of FIG. 14.
FIG. 17 is a cross-sectional view taken generally along the line 17-17 of FIG. 14.

In FIGS. 14-16, a composite wheel assembly 310 constructed in accordance with another aspect of the disclosure is shown, wherein the same reference numerals, offset by a factor of 300, are used to identify like features. The composite wheel assembly 310 includes the same features discussed above for composite wheel assembly 210 including a lightweight annular fiber-reinforced barrel 312, having radially inwardly facing inner surface 314 and a radially outwardly facing outer surface 316; a high strength, lightweight metal central hub assembly 320 including a central hub portion 322 and plurality of support spokes 324 extending radially outwardly from the central hub portion 322 to free ends 366 that are disconnected from one another, and thus, the outer periphery of the central hub assembly 320 is circumferentially discontinuous; an aesthetically pleasing, decorative, lightweight, wheel cladding 328 fixedly bonded to an outwardly facing surface 331 of at least a portion of the central hub assembly 320, with the cladding 328 having a plurality of cladding spokes 354 extending radially outward from a centrally-located hub region 356 to free ends 358; and an adhesive 364 disposed about (FIG. 17) at least some or all of a plurality of recessed pockets 344, immediately on an outer peripheral edge 368 of support spokes 324 facing away from the brake side and toward the environment side, and/or within at least some or all of a plurality of recessed pockets 244, and can further be disposed on at least a portion or the entirety of the central hub portion 322, and/or on a brake side of wheel cladding 328, whereupon wheel cladding 328 and central hub assembly 320 can be pressed together to form a permanent bond between central hub assembly 320 and wheel cladding 328 via the adhesive 364. The adhesive 364 can be provided as 1K RTV, 2K RTV, 1K hot melt, epoxy, and 2K urethane, by way of example and without limitation. Further provided are inserts 370 disposed in situ in the cavities 344 of the support spokes 324, as discussed above for inserts 70 of composition wheel assembly 210, and thus, further discussion regarding inserts 370 is believed unnecessary. Further yet, central hub assembly 320 is fixedly attached to a flange 327 of barrel 312 via a plurality of fasteners 337, including male threaded bolts 348 extending through a plurality of respective flange and hub through openings 335, 346, and female threaded nuts 348', as discussed above for fasteners 237, and thus, further discussion regarding fasteners 337 is believed unnecessary.

The composite wheel assembly 310 is shown to further include a plurality of decorative members 74 fixed to an outer surface 76 of the wheel cladding 328. The decorative members 74 can be provided of a molded thermoplastic or thermoset polymer, carbon fiber or carbon fiber reinforced material, fiber-glass, aramid fiber reinforced material, fiber reinforced thermoplastic or thermoset polymer. An outer surface 78 of the decorative members 74, facing toward an environment side 334 and away from the wheel cladding 328, can be painted, textured or otherwise finished to provide a particularly desired aesthetic appearance, such as a metal plated surface, by way of example and without limitation, and can further include an outer ultraviolet light protectant. Accordingly, the outward appearance of the decorative members 74 can be easily and economically provided with a specialized, highly detailed decorative finish, and can be provided having any desired pattern or array of colors desired, whether the same or different from one another, thereby providing enhanced color compliment or contrast, as desired, relative to the metal central hub portion and relative to the aluminum barrel 312. The decorative members 74 can be fixed to the wheel cladding 328 via any suitable fixation mechanism, including, by way of example and without limitation, a suitable adhesive 80 including a room temperature vulcanization silicone adhesive (RTV), or an alternate adhesive, such as epoxy, silicone-based hot melt adhesive, or any other suitable adhesive that would permanently fix the decorative members 74 to the wheel cladding 328 for the duration of the useful life of the vehicle, further including 1K RTV, 2K RTV, 1K hot melt, and 2K urethane, by way of example and without limitation. It is to be recognized that the selected adhesive can be placed on an inner surface of the decorative members 74 and/or on the outwardly facing surface of the wheel cladding 328 as a continuous layer or in sections or patterns, as desired. To further facilitate locating the decorative members 74 in precise locations on the wheel cladding 328, and to provide further decorative aspects, the cladding spokes 354 can be formed having recessed pockets 82 sized for close receipt of the decorative members 74 therein. The recessed pockets 82 can be formed to extend along the entire length of the cladding spokes 354 or along a portion thereof, and shown in a non-limiting example as extending along the full length of the cladding spokes 354 from immediately adjacent a central hub region 356 of the wheel cladding 128 radially outwardly into flush or substantially flush relation with a free end 358 of the cladding spokes 354. Accordingly, the recessed pockets 82 are shown extending along a full length of cladding spokes 354. The decorative members 74 can be recessed, proud (extend outwardly in raised fashion) and/or generally flush with the outer surface 76 of the cladding spokes 354, as desired, thereby providing an ability to form a dimensionally staggered, stepped, decorative appearance of the decorative members 74 relative to the cladding spokes 354. To further enhance the decorative appearance and to further facilitate assembly, an axially inwardly extending finger 84 (extending in generally parallel relation to the direction of a central axis 318) can be provided to extend axially into a plurality of lug nut receptacles or apertures 362 in the wheel cladding 328, with a radially outer free end 86 being configured for close abutting receipt, by way of example and without limitation, with the inner surface 314 of the barrel 312. Accordingly, the decorative members 74 can be sized and shaped for a unidirectional, precise puzzle-like fit on the cladding spokes 354, thereby being assured of being uniformly and symmetrically positioned relative to one another.

In accordance with another aspect of the disclosure, a method of constructing a composite wheel assembly 10, 110, 210, 310 is provided. The method includes providing a fiber-reinforced barrel 12, 112, 212, 312 having an inner surface 14, 114, 214, 314 and an outer surface 16, 116, 216, 316 configured to support a tire thereon. Further, providing a metal central hub assembly 20, 120, 220, 320 including a central hub portion 22, 122, 222, 322 and plurality of support spokes 24, 124, 224, 324 extending outwardly from the central hub portion 22, 122, 222, 322. Further, fixing the central hub portion 22, 122, 222, 322 to a flange 27, 127, 227, 337 extending radially inwardly from the inner surface 14, 114, 214, 314 of the barrel 12, 112, 212, 312. Further yet, fixing a wheel cladding 28, 128, 228, 328 to an outwardly facing surface 31, 131, 231, 331 of at least a portion of the central hub assembly 20, 120, 220, 320.

Further aspects of the method of construction can include one or more of the following: providing the wheel cladding 28, 128, 228, 328 being formed of at least one of the following materials: carbon fiber, fiber-glass, molded thermoplastic or thermoset polymer, or any other non-standard plastic material; permanently bonding the wheel cladding 28, 128, 228, 328 to the fiber-reinforced central hub assembly 20, 120, 220, 320 via at least one of a room temperature vulcanization silicone adhesive, or an alternate adhesive, such as epoxy or silicone-based hot melt adhesive; forming the metal central hub assembly 20, 120, 220, 320 via one of the following: forging aluminum, stamping aluminum, hydro-forming aluminum, and machining aluminum; providing the wheel cladding 28, 128, 228, 328 having at least one of a color and surface finish that contrasts with a color and surface finish of at least one of the annular fiber-reinforced barrel 12, 112, 212, 312 and metal central hub assembly 20, 120, 220, 320; permanently bonding the wheel cladding 28, 128, 228, 328 to at least some of the support spokes 24, 124, 224, 324; permanently bonding the wheel cladding 28, 128, 228, 328 to at least a portion of the central hub portion 22, 122, 222, 322 and to at least some of the support spokes 24, 124, 224, 324; permanently bonding the wheel cladding 28, 128, 228, 328 to each of the support spokes 24, 124, 224, 324; covering a substantial entirety of the outwardly facing surface 31, 131, 231, 331 of the metal central hub assembly 20, 120, 220, 320 with the wheel cladding 28, 128, 228, 328; forming cavities 44, 144, 244, 344 between at least some of the support spokes 24, 124, 224, 324 and the wheel cladding 28, 128, 228, 328 and providing vibration dampening inserts 70, 370 in the cavities 244, 344; bonding a plurality of decorative members 74 on an outer surface 76 of the wheel cladding 328; providing the wheel cladding 328 having cladding spokes 354 and permanently bonding the cladding spokes 354 to at least some of the support spokes 324, and further including bonding at least some decorative members 74 to at least some of the cladding spokes 354; and providing recessed pockets 82 in at least some of the cladding spokes 354 and bonding decorative members 74 in the recessed pockets 82.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varies in many ways. Such variations are not to be regarded as a departure from the disclosure, and all such modifications are intended to be included within the scope of disclosure.

What is claimed is:

1. A composite wheel assembly, comprising:
an annular fiber-reinforced barrel extending about a central axis about which said composite wheel assembly rotates, said annular fiber-reinforced barrel having a barrel inner surface, facing said central axis, and a barrel outer surface, facing away from said central axis, said barrel inner surface and said barrel outer surface extending axially between an environmental side and a brake side of said annular fiber-reinforced barrel, with at least one flange extending radially inwardly from said barrel inner surface between said environmental side and said brake side, with a region of said barrel inner surface extending from said at least one flange to said environmental side;
a metal central hub assembly having a central hub portion with a through opening extending about said central axis and a plurality of fastener openings configured for receipt of fasteners to facilitate fixation of the composite wheel assembly to a vehicle, and a plurality of support spokes extending radially outwardly from said central hub portion, said metal central hub assembly being attached to said at least one flange of said fiber-reinforced barrel;

a wheel cladding having a central hub region and a plurality of cladding spokes extending radially outward from said central hub region, said central hub region having a plurality of lugnut apertures configured to align with said plurality of fastener openings, said wheel cladding being fixedly bonded to at least a portion of an outwardly facing surface of said metal central hub assembly; and a plurality of decorative members bonded to an outer surface of said wheel cladding;

wherein at least some of said cladding spokes have recessed pockets extending radially outwardly from said central hub region, and wherein at least some of said plurality of decorative members are bonded to said cladding spokes in said recessed pockets.

2. The composite wheel assembly of claim 1, wherein said annular fiber-reinforced barrel is constructed of material including at least one of carbon fiber, fiber-glass fiber, basalt fiber.

3. The composite wheel assembly of claim 2, wherein said metal central hub assembly is formed from one of cast aluminum, forged aluminum, stamped aluminum, hydro-formed aluminum, cast magnesium, forged magnesium.

4. The composite wheel assembly of claim 1, wherein said at least one flange has a plurality of flange through openings and said metal central hub assembly has a plurality of hub openings configured in alignment with said flange through openings, and further including a plurality of fasteners extending into said flange through openings and into said hub openings and fixing said metal central hub assembly to said annular fiber-reinforced barrel.

5. The composite wheel assembly of claim 4, wherein said hub openings are threaded blind openings.

6. The composite wheel assembly of claim 5, wherein said threaded blind openings extend into at least some of said support spokes.

7. The composite wheel assembly of claim 5, wherein said flange through openings have counter-bores and said fasteners have threaded shanks configured for threaded engagement in said blind openings and enlarged tool receiving heads sized for receipt in said counter-bores.

8. The composite wheel assembly of claim 7, further including an adhesive disposed in said counter-bores and blocking access to said enlarged tool receiving heads.

9. The composite wheel assembly of claim 4, wherein said hub openings are through openings.

10. The composite wheel assembly of claim 9, further including a plurality of threaded nuts, wherein said fasteners have threaded shanks configured for threaded engagement with said threaded nuts.

11. The composite wheel assembly of claim 10, wherein said flange through openings have counter-bores and said fasteners having enlarged tool receiving heads sized for receipt in said counter-bores.

12. The composite wheel assembly of claim 10, wherein said threaded nuts are disposed between said metal central hub assembly and said wheel cladding.

13. The composite wheel assembly of claim 10, wherein said hub openings extend through at least some of said support spokes.

14. The composite wheel assembly of claim 1, wherein said support spokes extend radially outwardly from said central hub portion to free ends.

15. The composite wheel assembly of claim 1, wherein said support spokes extend radially outwardly from said central hub portion to an annular band, said annular band and said support spokes bounding a plurality of turbine openings and said annular band abutting said at least one flange.

16. The composite wheel assembly of claim 1, wherein said wheel cladding is permanently bonded to at least some of said support spokes.

17. The composite wheel assembly of claim 16, wherein said wheel cladding is permanently bonded to at least a portion of said central hub portion.

18. The composite wheel assembly of claim 17, wherein said wheel cladding covers a substantial entirety of said outwardly facing surface of said metal central hub assembly.

19. The composite wheel assembly of claim 1, wherein cavities are formed between said support spokes and said wheel cladding.

20. The composite wheel assembly of claim 19, further including inserts contained within said cavities.

21. The composite wheel assembly of claim 20, wherein said inserts are formed of a light weight material.

22. The composite wheel assembly of claim 20, wherein said inserts are preformed of a foam material and permanently bonded to said support spokes.

23. The composite wheel assembly of claim 20, wherein the inserts are permanently bonded to the metal central hub assembly using an adhesive selected from at least one of the following: 1K RTV, 2K RTV, 1K hot melt, epoxy, and 2K urethane.

24. The composite wheel assembly of claim 1 wherein the metal central hub assembly includes through holes for securing the composite wheel assembly to a vehicle.

25. The composite wheel assembly of claim 1, wherein said decorative members are permanently bonded to said outer surface of said wheel cladding using an adhesive selected from at least one of the following: 1K RTV, 2K RTV, 1K hot melt, epoxy, and 2K urethane.

26. The composite wheel assembly of claim 1, wherein at least some of said decorative members have fingers extending into said lug nut apertures.

27. The composite wheel assembly of claim 1, wherein cavities are formed between said support spokes and said cladding spokes, and further including inserts formed of a light weight material contained within said cavities.

28. The composite wheel assembly of claim 1, wherein said wheel cladding is formed from one of a thermoplastic material, a thermosetting material, a carbon fiber or carbon fiber reinforced material, a fiber-glass material, a material reinforced with an aramid fiber, other fiber reinforced thermoplastic, thermosetting material.

29. The composite wheel assembly of claim 28, wherein said wheel cladding has an outer surface with at least one of an ultraviolet light protectant, a metalizing treatment, texturing treatment, a paint over-coating, and a selective paint coating thereon.

30. The composite wheel assembly of claim 29, wherein a color of the outwardly facing surface of the wheel cladding is different than a color of the barrel inner surface of the annular fiber-reinforced barrel.

31. The composite wheel assembly of claim 28, wherein said wheel cladding is permanently bonded to said metal central hub assembly using an adhesive selected from at least one of the following: 1K RTV, 2K RTV, 1K hot melt, epoxy, and 2K urethane.

32. A method of constructing a composite wheel assembly, comprising:

providing an annular fiber-reinforced barrel extending about a central axis about which said composite wheel assembly rotates, with said annular fiber-reinforced barrel having a barrel inner surface facing said central axis and a barrel outer surface facing away from said central axis with at least one flange extending radially inwardly from said barrel inner surface;

providing a metal central hub assembly having a central hub portion with a through opening extending about said central axis and a plurality of support spokes extending radially outwardly from said central hub portion;

attaching said metal central hub assembly to said at least one flange of said fiber-reinforced barrel;

fixedly bonding a wheel cladding to at least a portion of an outwardly facing surface of said metal central hub assembly, said wheel cladding having a central hub region and a plurality of cladding spokes extending radially outward from said central hub region;

providing said flange with a plurality of flange through openings having counter-bores and providing said metal central hub assembly with a plurality of hub openings, aligning said flange through openings with said hub openings, and fixing a plurality of fasteners having enlarged tool receiving heads in said flange through openings and said hub openings and disposing said enlarged tool receiving heads in said counter-bores to fix said metal central hub assembly to said fiber-reinforced barrel;

bonding a plurality of decorative members to an outer surface of said wheel cladding;

wherein at least some of said cladding spokes have recessed pockets extending radially outwardly from said central hub region, and wherein at least some of said plurality of decorative members are bonded to said cladding spokes in said recessed pockets.

33. The method of claim 32, further including providing the annular fiber-reinforced barrel including at least one of: carbon fibers, fiber-glass fibers, basalt fibers.

34. The method of claim 33, further including providing the wheel cladding being formed of one of a thermoplastic material, a thermosetting material, a carbon fiber material, a carbon fiber reinforced material, a fiberglass material, an aramid fiber reinforced material, a fiber reinforced thermoplastic material, a fiber reinforced thermoset material.

35. The method of claim 33, further including providing the metal central hub assembly being formed via one of the following: forging aluminum, stamping aluminum, hydro-forged aluminum, casting magnesium, forging magnesium.

36. The method of claim 35, further including providing the wheel cladding having at least one of a color and surface finish that contrasts with a color and surface finish of at least one of the annular fiber reinforced barrel and metal central hub assembly.

37. The method of claim 32, further comprising:
providing said hub openings as threaded blind openings and threading said fasteners into said threaded blind openings.

38. The method of claim 32, further comprising:
disposing an adhesive in said counter-bores and blocking access to said enlarged tool receiving heads.

39. The method of claim 32, further comprising:
providing said hub openings as through openings, extending said fasteners through said flange through openings and through said hub openings and threading nuts on threaded shanks of said fasteners.

40. The method of claim 32, further comprising:
providing cavities between said support spokes and said wheel cladding and disposing inserts formed of a light weight material within said cavities.

41. The method of claim 40, further including preforming said inserts and fixing said inserts in said cavities with an adhesive.

42. A method of constructing a composite wheel assembly, comprising:
providing an annular fiber-reinforced barrel extending about a central axis about which said composite wheel assembly rotates, with said annular fiber-reinforced barrel having a barrel inner surface facing said central axis and a barrel outer surface facing away from said central axis with at least one flange extending radially inwardly from said barrel inner surface;

providing a metal central hub assembly having a central hub portion with a through opening extending about said central axis and a plurality of support spokes extending radially outwardly from said central hub portion;

attaching said metal central hub assembly to said at least one flange of said fiber-reinforced barrel;

fixedly bonding a wheel cladding to at least a portion of an outwardly facing surface of said metal central hub assembly;

providing said flange with a plurality of flange through openings having counter-bores and providing said metal central hub assembly with a plurality of hub openings, aligning said flange through openings with said hub openings, and fixing a plurality of fasteners having enlarged tool receiving heads in said flange through openings and said hub openings and disposing said enlarged tool receiving heads in said counter-bores to fix said metal central hub assembly to said fiber-reinforced barrel;

providing said hub openings as through openings, extending said fasteners through said flange through openings and through said hub openings and threading nuts on threaded shanks of said fasteners; and bringing said nuts into abutment with said metal central hub assembly with said nuts being disposed between said metal central hub assembly and said wheel cladding.

* * * * *